(12) United States Patent
Nishikawa et al.

(10) Patent No.: US 10,079,545 B2
(45) Date of Patent: Sep. 18, 2018

(54) CURRENT RESONANT TYPE DC VOLTAGE CONVERTER, CONTROL INTEGRATED CIRCUIT, AND CURRENT RESONANT TYPE DC VOLTAGE CONVERSION METHOD

(71) Applicant: OMRON Corporation, Kyoto-shi, Kyoto (JP)

(72) Inventors: Takeo Nishikawa, Kyoto (JP); Takashi Hyodo, Kusatsu (JP); Toshiyuki Yokoi, Kasugai (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/119,737

(22) PCT Filed: Feb. 19, 2015

(86) PCT No.: PCT/JP2015/054523
§ 371 (c)(1),
(2) Date: Aug. 18, 2016

(87) PCT Pub. No.: WO2015/137069
PCT Pub. Date: Sep. 17, 2015

(65) Prior Publication Data
US 2017/0054379 A1     Feb. 23, 2017

(30) Foreign Application Priority Data

Mar. 13, 2014   (JP) ................. 2014-050634

(51) Int. Cl.
*H02M 3/335*     (2006.01)
*H02M 1/088*     (2006.01)
(Continued)

(52) U.S. Cl.
CPC ....... *H02M 3/33569* (2013.01); *H02M 1/088* (2013.01); *H02M 2001/0022* (2013.01);
(Continued)

(58) Field of Classification Search
CPC ......... H02M 1/088; H02M 2001/0022; H02M 2001/0058; H02M 2007/4818;
(Continued)

(56) References Cited

U.S. PATENT DOCUMENTS 4,628,540 A * 12/1986 Hendriks .................. H03J 3/28
                                                          331/177 V
5,388,040 A    2/1995 Hall
(Continued)

FOREIGN PATENT DOCUMENTS

CN          202231500 U     5/2012
EP            1369985 A2    12/2003
(Continued)

OTHER PUBLICATIONS

Miyawaki et al., Operational Verification of the Bi-directional Isolated DC/DC Converter using Series Voltage Compensation, Lecture papers of Technical Meeting on Semiconductor Power Conversion, Jan. 27, 2012, SPC-12-025.
(Continued)

*Primary Examiner* — Fred E Finch, III
*Assistant Examiner* — Demetries A Gibson
(74) *Attorney, Agent, or Firm* — Metrolexis Law Group, PLLC

(57) ABSTRACT

A current resonant type DC voltage converter includes: a switching circuit configured to generate an AC voltage from a DC input voltage; a LC resonance circuit configured to resonate in response to application of the AC voltage to a resonant capacitor and a resonant coil; a transformer having a primary side connected in series to the LC resonance circuit; a parallel resonant inductance present in parallel to the transformer; a rectifier circuit configured to rectify a current appearing on a secondary side of the transformer to generate a DC output voltage; and a parallel resonant
(Continued)

inductance adjustment circuit configured to change the parallel resonant inductance.

10 Claims, 12 Drawing Sheets

(51) Int. Cl.
  *H02M 1/00* (2006.01)
  *H02M 7/48* (2007.01)
(52) U.S. Cl.
  CPC ............ *H02M 2001/0058* (2013.01); *H02M 2007/4818* (2013.01); *Y02B 70/1433* (2013.01); *Y02B 70/1441* (2013.01); *Y02B 70/1491* (2013.01)
(58) Field of Classification Search
  CPC ............ H02M 3/33569; H02M 3/3376; Y02B 70/1433; Y02B 70/1441; Y02B 70/1491; H02J 7/022; Y02T 90/127
  See application file for complete search history.

(56) References Cited

U.S. PATENT DOCUMENTS

| | | | |
|---|---|---|---|
| 8,842,449 B1* | 9/2014 | Tong | H02M 3/33507 363/21.02 |
| 2004/0066178 A1 | 4/2004 | Mizoguchi et al. | |
| 2008/0144339 A1* | 6/2008 | Hsieh | H02M 3/33592 363/21.02 |
| 2008/0247194 A1* | 10/2008 | Ying | H02M 3/3376 363/17 |
| 2009/0290385 A1 | 11/2009 | Jungreis et al. | |
| 2009/0303753 A1* | 12/2009 | Fu | H02M 3/33592 363/20 |
| 2010/0220505 A1 | 9/2010 | Tsuruya | |
| 2013/0194831 A1* | 8/2013 | Hu | H02M 3/33507 363/21.01 |
| 2014/0185330 A1* | 7/2014 | Huang | H02M 3/3376 363/21.02 |
| 2015/0118984 A1* | 4/2015 | Nagumo | H04B 1/0458 455/193.1 |
| 2015/0124492 A1* | 5/2015 | Fu | H02M 3/33546 363/21.02 |
| 2015/0236600 A1* | 8/2015 | Waffler | H02M 3/33515 378/119 |

FOREIGN PATENT DOCUMENTS

| | | |
|---|---|---|
| JP | 2002-354804 A | 12/2002 |
| JP | 2005-065395 A | 3/2005 |
| JP | 2010-011625 A | 1/2010 |
| JP | 2012-029436 A | 2/2012 |

OTHER PUBLICATIONS

Extended European search report dated Oct. 24, 2017 in the counterpart European patent application.

Korean Office Action dated Jan. 1, 2018 in a counterpart Korean patent application.

* cited by examiner (a)

(b)

(a) Conventional design (b) Parallel resonant inductance adjustment system

US 10,079,545 B2

CURRENT RESONANT TYPE DC VOLTAGE CONVERTER, CONTROL INTEGRATED CIRCUIT, AND CURRENT RESONANT TYPE DC VOLTAGE CONVERSION METHOD

TECHNICAL FIELD

The present invention relates to a DC voltage converter (DC-DC converter) which converts a DC voltage into another DC voltage, and particularly, to a current resonant type DC voltage converter, which is one of typical circuits of an insulation type DC-DC converter, a control integrated circuit and a current resonant type DC voltage conversion method.

BACKGROUND ART

Among conventional DC-DC converters which convert a DC voltage into another DC voltage, in particular, a current resonant type converter (of an LLC system or the like) has a circuit system basically easy to achieve high efficiency, which is one of typical circuits of an insulation type DC-DC converter and which allows for soft switching operation (see e.g. Patent Document 1).

A current resonant type converter recited in Patent Document 1 includes a switching circuit which has a switching element that is turned on or off in response to a control signal having a switching frequency and which converts a DC input voltage into an AC voltage by the switching element to output a first AC voltage; a resonance circuit which has resonant inductor and capacitor and receives an input of the first AC voltage to resonate at a predetermined resonance frequency, thereby outputting a resonance signal; a transformer having a primary wiring which receives an input of the resonance signal and a secondary wiring insulated from the primary wiring; a rectifier circuit which converts a second AC voltage output from the secondary wiring into a direct current to generate an output voltage and outputs the output voltage from an output side; and a control circuit which detects the output voltage and generates the control signal to turn on or off the switching element, the current resonant type converter having a predetermined output voltage-switching frequency characteristics at the switching frequency with respect to the output voltage, in which the control circuit includes an output voltage detection unit which detects the output voltage at starting to obtain a detection result, a frequency determination unit which determines the switching frequency for starting soft-start that enables power supply to the output side based on the output voltage-switching frequency characteristics and the detection result; and a frequency control unit which controls start of the current resonant type converter by turning the switching element on or off by the control signal that gradually decreases the switching frequency after starting at the determined switching frequency.

In such a current resonant type converter as recited in Patent Document 1, when applied to a solar panel or a storage battery in which an input or output voltage fluctuates largely, gain (output voltage/input voltage) control several times or wider is realized by decreasing resonant inductance values present in parallel on a preliminary side of a transformer of a circuit to increase a resonance current. However, in this case, losses caused by a resonance current are increased, resulting in a difficulty in achieving high efficiency.

Another system is proposed in which an additional circuit is provided for series compensation of a voltage fluctuation (see e.g. Non-Patent Document 1).

However, a bi-directional isolated DC-DC converter recited in Non-Patent Document 1 involves such problems as an increase in the number of switching elements and an increase in a loss in a compensation circuit.

PRIOR ART DOCUMENTS

Patent Document

Patent Document 1: Japanese Unexamined Patent Publication No. 2012-029436

Non-Patent Document

Non-Patent Document 1: Satoshi Miyawaki and two other persons, "Operational Verification of the Bi-directional Isolated DC/DC Converter using Series Voltage Compensation", lecture papers of Technical Meeting on Semiconductor Power Conversion, Jan. 27, 2012, SPC-12-025.

SUMMARY OF THE INVENTION

Problems to be Solved by the Invention

In view of the foregoing problems of conventional art, an object of the present invention is to provide a current resonant type DC voltage converter, a control integrated circuit and a current resonant type DC voltage conversion method which achieve high efficiency while minimizing an increase in the number of switching elements or an increase in a loss in a compensation circuit or the like even in application in which an input or output voltage fluctuates largely.

Means for Solving the Problem

In order to achieve the above object, the current resonant type DC voltage converter of the present invention includes a switching unit configured to generate an AC voltage from a DC input voltage; a resonance unit configured to resonate in response to application of the AC voltage to a resonant capacitance and a first resonant inductance; a transformer having a primary side thereof connected in series to the resonance unit; a second resonant inductance present in parallel to the transformer; a rectifier configured to rectify a current appearing on a secondary side of the transformer to generate a DC output voltage; and a parallel resonant inductance adjustment unit configured to vary the second resonant inductance.

Here, the current resonant type DC voltage converter of the present invention may include a voltage detection unit configured to detect the input voltage or the output voltage, in which the parallel resonant inductance adjustment unit has a resonant inductance present in parallel to the transformer (for which an excitation inductance of the transformer may be used or which may be externally provided), and has an adjusting inductance connected in parallel on the primary side of the transformer via a second switch, and the current resonant type DC voltage converter may further include a second switch controller which controls switching of the second switch based on the input voltage or the output voltage detected by the voltage detection unit. Additionally, the second switch controller may have a transition condition voltage range fixed as a condition for a switching state transition of the second switch, and the second switch controller may conduct control to open the second switch when the input voltage or the output voltage is within the transition condition voltage range and close the second switch when the input voltage or the output voltage is not within the transition condition voltage range.

Thus configured current resonant type DC voltage converter enables a drastic reduction of various kinds of losses in the vicinity of a rated value with a minimum of additional circuits, thereby improving efficiency.

Additionally, in the current resonant type DC voltage converter of the present invention, the second switch controller may vary the transition condition voltage range for the second switch being closed with respect to the transition condition voltage range for the second switch being opened to make switching control of the second switch have a hysteresis. For example, the second switch controller may make the transition condition voltage range for the second switch being closed relatively narrow at at least one of both ends thereof with respect to the transition condition voltage range for the second switch being opened.

Even when the input voltage or the output voltage minutely fluctuates in the vicinity of a lower limit or an upper limit of the transition condition voltage range, thus configured current resonant type DC voltage converter is capable of suppressing such a phenomenon that the second switch repeats switching each time as much as possible.

Additionally, in the current resonant type DC voltage converter of the present invention, the second switch may include a first rectifier unit; a first direction switch connected in series to the first rectifier unit; a second rectifier unit; and a second direction switch connected in series to the second rectifier unit, in which when a rectification direction of the first rectifier unit is set to be a first direction and a rectification direction of the second rectifier unit is set to be a second direction, the first rectifier unit and the first direction switch may be connected in parallel to the second rectifier unit and the second direction switch so that the first direction and the second direction are reverse to each other.

Here, the current resonant type DC voltage converter of the present invention may further include a parallel resonance current detection unit configured to detect a parallel resonance current value flowing through a parallel resonant inductance of the transformer and a parallel resonance current direction, in which in a case where both the first direction switch and the second direction switch are closed, when the input voltage or the output voltage changes from outside to within the transition condition voltage range, if the parallel resonance current direction is the first direction, the second switch controller may control the first direction switch and the second direction switch so as to first open the second direction switch and then, after the parallel resonance current value attains 0, open the first direction switch, and if the parallel resonance current direction is the second direction, so as to first open the first direction switch and then, after the parallel resonance current value attains 0, open the second direction switch. Further, the second switch controller may control the first direction switch and the second direction switch so as to be closed simultaneously when both the first direction switch and the second direction switch are opened, if the input voltage changes from within to outside the transition condition voltage range.

In thus configured current resonant type DC voltage converter, since the second switch including the first direction switch and the second direction switch is opened with no current flowing through the adjusting inductor, it is possible to suppress generation of a surge voltage, as well as further reducing reverse recovery losses of the first rectifier unit and the second rectifier unit.

Additionally, a control integrated circuit containing the above-described second switch controller of the current resonant type DC voltage converter is also covered by the scope of the present invention.

Thus configured control integrated circuit realizes the current resonant type DC voltage converter of the present invention with ease.

Alternatively, the current resonant type DC voltage conversion method of the present invention includes a switching step of generating an AC voltage from a DC input voltage; a resonance step in which a resonance unit having a resonant capacitance and a first resonant inductance resonates in response to application of the AC voltage; a transformation step in which a transformer having a primary side thereof connected in series to the resonance unit conducts transformation; a rectification step of rectifying a current appearing on a secondary side of the transformer to generate a DC output voltage; and a resonant inductance adjustment step of varying a second resonant inductance present in parallel to the transformer.

Thus configured current resonant type DC voltage conversion method enables a drastic reduction of various kinds of losses in the vicinity of a rated value with a minimum of additional circuits, thereby improving efficiency.

Effect of the Invention

The current resonant type DC voltage converter and the current resonant type DC voltage conversion method of the present invention enable a drastic reduction of various kinds of losses in the vicinity of a rated value with a minimum of additional circuits, thereby improving efficiency.

The control integrated circuit of the present invention realizes the current resonant type DC voltage converter of the present invention with ease.

BRIEF DESCRIPTION OF THE DRAWINGS

FIGS. 2(a) and 2(b) show a concept of the present invention in the current resonant type converter 100, in which FIG. 2(a) is a diagram for explaining a case where a parallel resonant inductance adjusting switch SW5 is off and FIG. 2(b) is a diagram for explaining a case where the switch SW5 is on.

FIGS. 5(a) and 5(b) illustrate current waveforms of coils and a transformer in the current resonant type converter 100 when the input voltage Vin is 350 V and the output is 4 kW in comparison with a conventional design, in which FIG. 5(a) is a graph of each current waveform in the conventional design and FIG. 5(b) is a graph of each current waveform in the current resonant type converter 100.

FIGS. 10(a) to 10 (e) are diagrams for explaining an outline of an operation sequence of the parallel resonant inductance adjusting switch SW5C in the parallel resonant inductance adjustment system current resonant type converter according to the third embodiment of the present invention.

MODE FOR CARRYING OUT THE INVENTION

In the following, several embodiments of the current resonant type DC voltage converter and the control integrated circuit according to the present invention will be described.

<General Configuration of First Embodiment>

Figure 1:
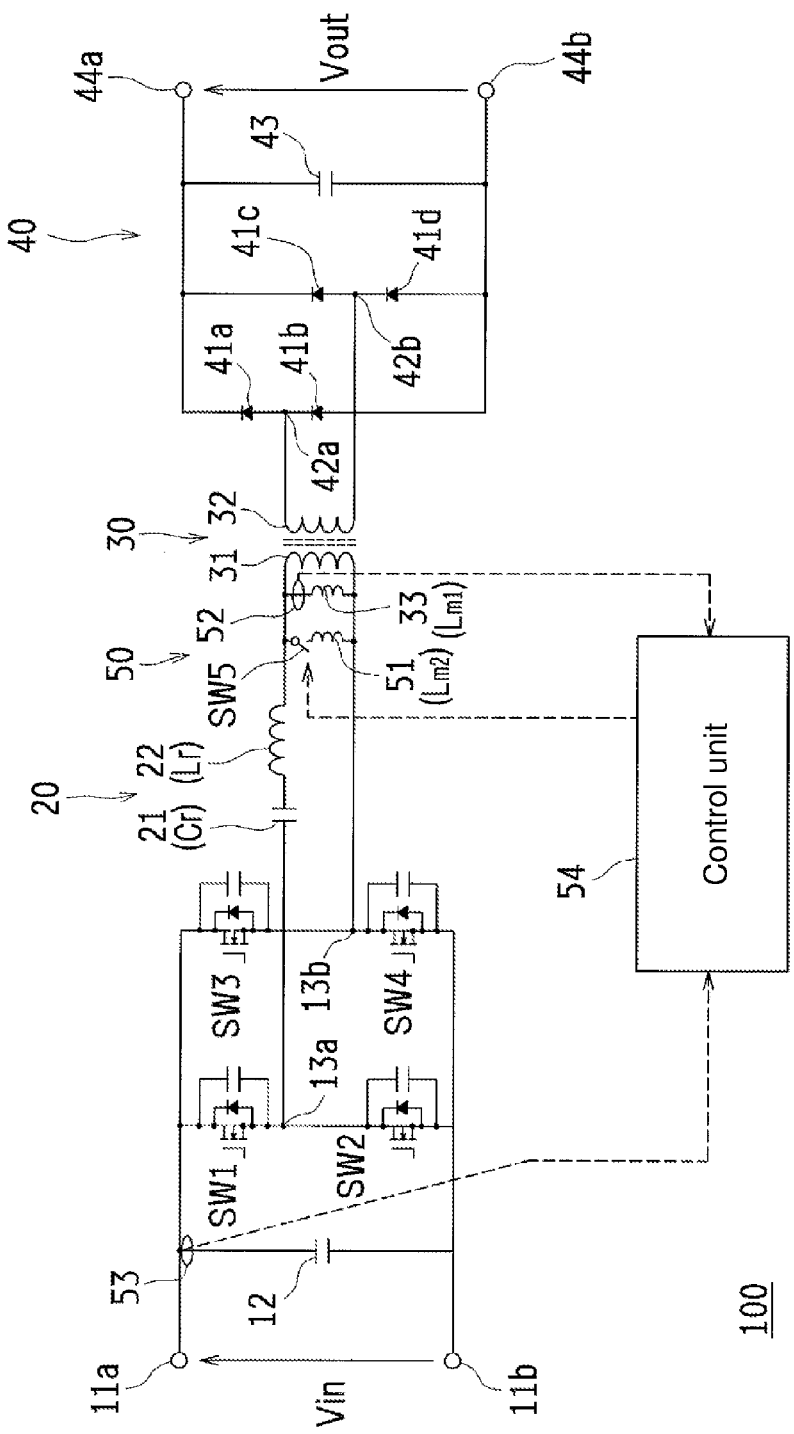
FIG. 1 is a diagram showing an outline configuration of a parallel resonant inductance adjustment system current resonant type converter 100 according to a first embodiment of the present invention.

FIG. 1 is a diagram showing an outline configuration of a parallel resonant inductance adjustment system current resonant type converter 100 according to a first embodiment of the present invention.

As illustrated in FIG. 1, the current resonant type converter 100 includes a switching circuit 10, a LC resonance circuit 20, a transformer 30, a rectifier circuit 40, and a parallel resonant inductance adjustment circuit 50.

In the switching circuit 10, connected in parallel to an input terminal pair 11a, 11b to which a DC input voltage Vin is input are an input smoothing capacitor 12, a switch SW1 and a switch SW2 connected in series, and a switch SW3 and a switch SW4 connected in series. These switches SW1 to SW4 configure a fullbridge switching circuit.

Although examples of the switches SW1 to SW4 include switching elements such as a field effect transistor (FET) and IGBT, the switches are not limited thereto.

In the switching circuit 10, switching each state of the switches SW1 to SW4 at a switching frequency f at predetermined timing in a time series manner generates an AC voltage between a connection point 13a between the switch SW1 and the switch SW2 and a connection point 13b between the switch SW3 and the switch SW4. Although no control unit for the switching frequency f is illustrated, applicable is a unit configured to adjust the switching frequency f by monitoring an output voltage or an output current. The control unit is not limited thereto. A control unit 54 which will be described later may be also served as this control unit.

The LC resonance circuit 20 has a resonant capacitor 21 (capacitance Cr) and a resonant coil 22 (inductance Lr) connected in series, which configure a first resonance circuit. Application of the AC voltage generated by the switching circuit 10 from the connection point 13a (connected to the resonant capacitor 21 side) and from the connection point 13b (connected to the resonant coil 22 side via a primary side winding 31 of the transformer 30 which will be described later) makes the LC resonance circuit 20 resonate at an inherent resonance frequency fr.

The transformer 30 has the primary side winding 31 and a secondary side winding 32, and the primary side winding 31 and the secondary side winding 32 are insulated from each other. One end of primary side winding 31 is connected in series to the resonant coil 22 side of the LC resonance circuit 20, and other end of the primary side winding 31 is connected to the connection point 13b of the switching circuit 10. In this transformer 30, a secondary voltage according to a primary voltage applied to the primary side winding 31 and a winding ratio appears on the secondary side winding 32.

In the primary side winding 31 of the transformer 30, a coil 33 corresponding to a parallel resonant inductance Lm1 is equivalently present which is obtained by parallelly dividing a resonant inductance component (for which an excitation inductance of the transformer may be used or which may be externally provided). In an LLC circuit, the above-described resonant capacitor 21, resonant coil and parallel resonant inductance configure a second resonance circuit, and this LLC resonance circuit resonates at an inherent resonance frequency fr2.

In the rectifier circuit 40, connected in parallel to an output terminal pair 44a, 44b from which a DC output voltage Vout is output are an output smoothing capacitor 43, a rectifier element 41a and a rectifier element 41b connected in series so as to have rectification directions coincident with each other (upward in FIG. 1), and a rectifier element 41c and a rectifier element 41d connected in series so as to have rectification directions (upward in FIG. 1) coincident with these rectification directions. Examples of the rectifier elements 41a to 41d include, for example, a diode, but the elements are not limited thereto.

To a connection point 42a between the rectifier element 41a and the rectifier element 41b of the rectifier circuit 40, one end of the secondary side winding 32 of the transformer 30 is connected, and to a connection point 42b between the rectifier element 41c and the rectifier element 41d, other end of the secondary side winding 32 of the transformer 30 is connected. This makes the rectifier circuit 40 generate the DC output voltage Vout in the output terminal pair 44a, 44b.

The parallel resonant inductance adjustment circuit 50 has a parallel resonant inductance adjusting coil 51, and a parallel resonant inductance adjusting switch SW5 connected in series to the coil 51 to switch current passing or cutoff, thereby substantially changing the parallel resonant inductance Lm1, the coil 51 and the switch SW5 being connected in parallel to the coil 33 corresponding to the parallel resonant inductance Lm1. The parallel resonant inductance adjustment circuit 50 further has a current sensor 52 configured to detect a value and a direction of a current passing through the coil 33, a voltage sensor 53 configured to detect a voltage value of the input voltage Vin at the input terminal pair 11*a*, 11*b* of the switching circuit 10, and a control unit 54 configured to receive detection signals from the current sensor 52 and the voltage sensor 53 and to control switching of the switch SW5 based on these detection results.

Similarly to the switches SW1 to SW4, although examples of the switch SW5 include switching elements such as a field effect transistor (FET) and IGBT, the switch is not limited thereto. As a replacement of the voltage sensor 53, for example, a simple resistance voltage dividing circuit configured to divide the input voltage Vin can be used when the control unit 54 has an A/D input terminal. This is because connecting a divided voltage to the A/D input terminal of the control unit 54 enables the control unit 54 to detect the input voltage Vin from a voltage division ratio of the resistance voltage dividing circuit and from an A/D conversion result. Voltage detection is, however, not limited to such a method. Additionally, in place of the input voltage Vin, the voltage sensor 53 may be arranged at a place for detecting the output voltage Vout, for example.

When the switch SW5 is turned on by the control unit 54, the coil 51 will be connected in parallel to the coil 33 corresponding to the parallel resonant inductance Lm1, so that a substantial parallel resonant inductance Lm is expressed as follows:

$$Lm1//Lm2 = Lm1 \times Lm2/(Lm1+Lm2).$$

The simplest example of switching control of the switch SW5 by the control unit 54 includes control in which with a transition condition voltage range predetermined as an on-off switching condition for the switch SW5, based only on the input voltage Vin detected by the voltage sensor 53, when the input voltage Vin is within the transition condition voltage range, the switch SW5 is tuned off and when the same is not within the transition condition voltage range, the switch SW5 is tuned on, but the control is not limited thereto.

Figure 2:
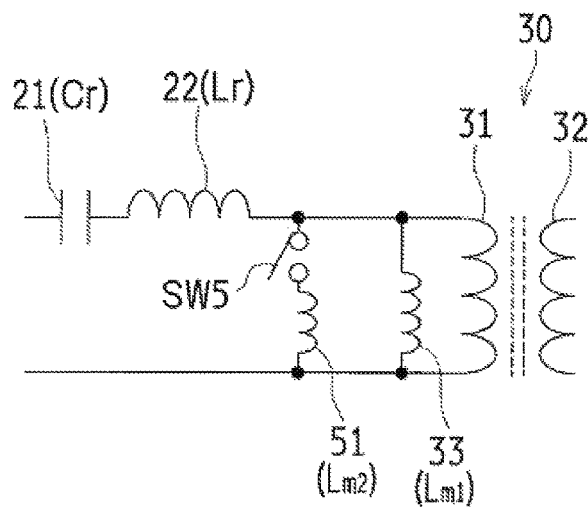
Figure 2:
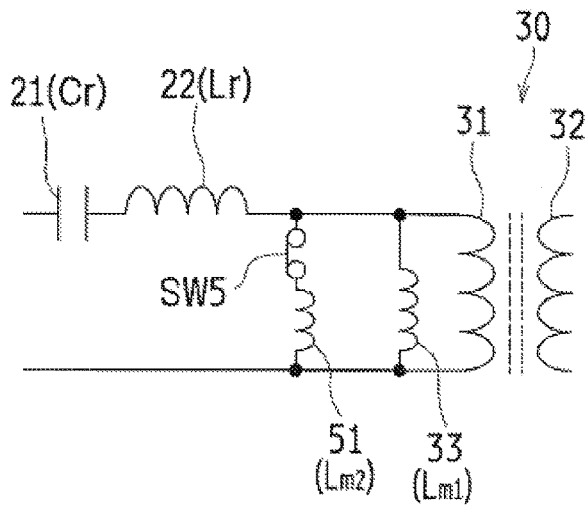

FIGS. 2(*a*) and 2(*b*) show a concept of the present invention in the current resonant type converter 100, in which FIG. 2(*a*) is a diagram for explaining a case where the parallel resonant inductance adjusting switch SW5 is opened (off) and FIG. 2(*b*) is a diagram for explaining a case where the switch SW5 is closed (on).

As has been described with reference to FIG. 1, in the first embodiment, with an adjusting parallel resonant inductance Lm2 provided other than the parallel resonant inductance Lm1 as a basis, switching on or off of the switch SW5 enables control of enable or disable of the adjusting parallel resonant inductance Lm2.

In an operation region where the adjusting parallel resonant inductance Lm2 is unnecessary (an input and output voltage condition which can be adjusted by the parallel resonant inductance Lm1 only), as illustrated in FIG. 2(*a*), the substantial parallel resonant inductance Lm is made relatively large by turning off the switch SW5 to invalidate the adjusting parallel resonant inductance Lm2. Although this decreases a resonance current to reduce losses, thereby improving efficiency, a gain adjustment range is narrow. Accordingly, in the vicinity of a rated value where efficiency is emphasized, the switch SW5 is preferably used while being turned off.

By contrast, in an operation region where a large resonance current is necessary (an input and output voltage condition which cannot be adjusted by the parallel resonant inductance Lm1 only), the substantial parallel resonant inductance Lm is made relatively small (Lm1//Lm2) by turning on the switch SW5 to validate the adjusting parallel resonant inductance Lm2. Although this increases the resonance current to increase losses, the gain adjustment range is large. Accordingly, in a region requiring a wide gain adjustment range, such as a region largely out of the vicinity of the rated value, the switch SW5 is preferably used while being turned on.

Although in the above-described parallel resonant inductance adjustment circuit 50, the coil 51 and the switch SW5 connected in series are connected in parallel to the coil 33 corresponding to the parallel resonant inductance Lm1, a coil and a switch similarly connected in series may be connected in parallel to conduct control by a combination of the respective switches.

<Example of Circuit Design and Effect Thereof in the First Embodiment>

Next, for verifying effects of the invention of the present application, circuit parameters (Lr, Lm1, and Cr) were designed under the following conditions.

primary side voltage: minimum=200 V, maximum=500 V, rated value=350 V secondary side voltage: minimum=350 V, maximum=350 V, rated value=350 V output: 4 kW maximum output current: 11.43 A switching frequency f: minimum=55 kHz, maximum=150 kHz Since the entire region of the input voltage Vin is 200 V to 500 V, under a condition that a limited region in the vicinity of the rated value is 320 V to 440 V, such a resolution as follows was obtained when finding a solution by which Lr and Cr were substantially equal.

entire region (200 V to 500 V)
transformer winding ratio 1:1
Lr=23.4 μH
Lm=46.8 μH
Cr=130.2 μF limited region (320 V to 440 V)
transformer winding ratio 1:1
Lr=24.3 μH
Lm=146.0 μH
Cr=130.6 μF For substantially realizing such a design result by the current resonant type converter 100, circuit parameters can be determined as follows.

Lr=24 μH
Lm1=146 μH
Lm2=69 μH
Cr=130 μF

Additionally, used as a comparison was a current resonant type converter according to the conventional art using such circuit parameters as follows.

Lr=24 μH
Lm1=46.8 μH
Cr=130 μF

Following is description of a result obtained from a circuit simulation and an analysis thereof conducted with respect to each of the current resonant type converter 100 according to the first embodiment and the current resonant type converter according to the conventional art (without provision of the adjusting parallel resonant inductance Lm2 and the switch SW5, output voltage: 350 V, output: 4 kW) both using thus determined circuit parameters.

Figure 3:
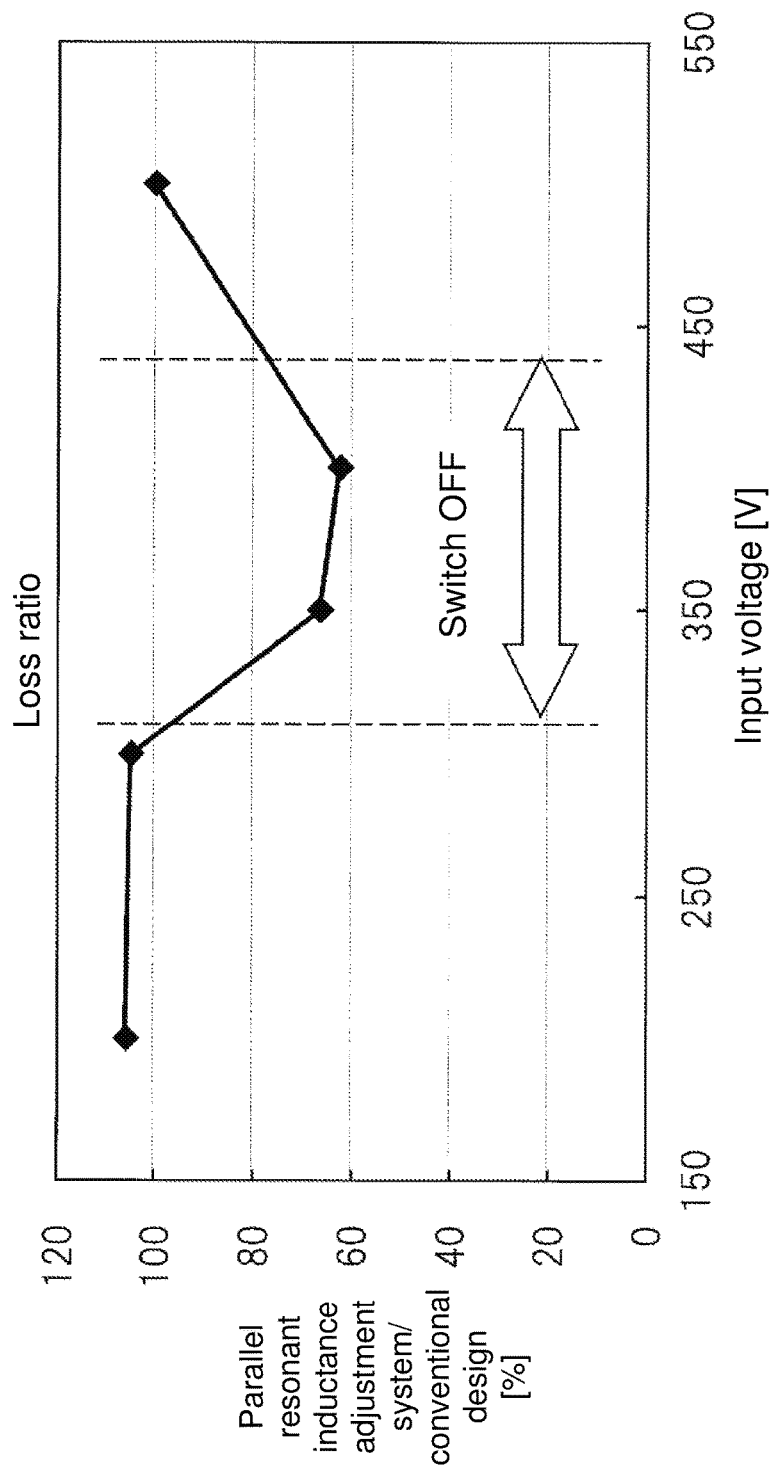
FIG. 3 is a graph illustrating losses by the current resonant type converter 100 according to an input voltage Vin as a relative ratio to a conventional design.

FIG. 3 is a graph illustrating losses by the current resonant type converter 100 according to the input voltage Vin as a relative ratio to a conventional design. Here, losses represent a total of a switch loss and a loss of a coil or a transformer (copper loss).

As illustrated in FIG. 3, when the input voltage Vin is within the limited region of 320 V to 440 V (hereinafter, referred to as "transition condition voltage range"), the switch SW5 is turned off. For example, when the input voltage Vin was 350 V or 400 V, it was found that the losses were both reduced to near 60% of the conventional design.

Thus, in the current resonant type converter 100, efficiency in the vicinity of the rated value can be improved by turning off the parallel resonant inductance adjusting switch SW5 in the transition condition voltage range of the input voltage Vin and otherwise, turning on the same.

Figure 4:
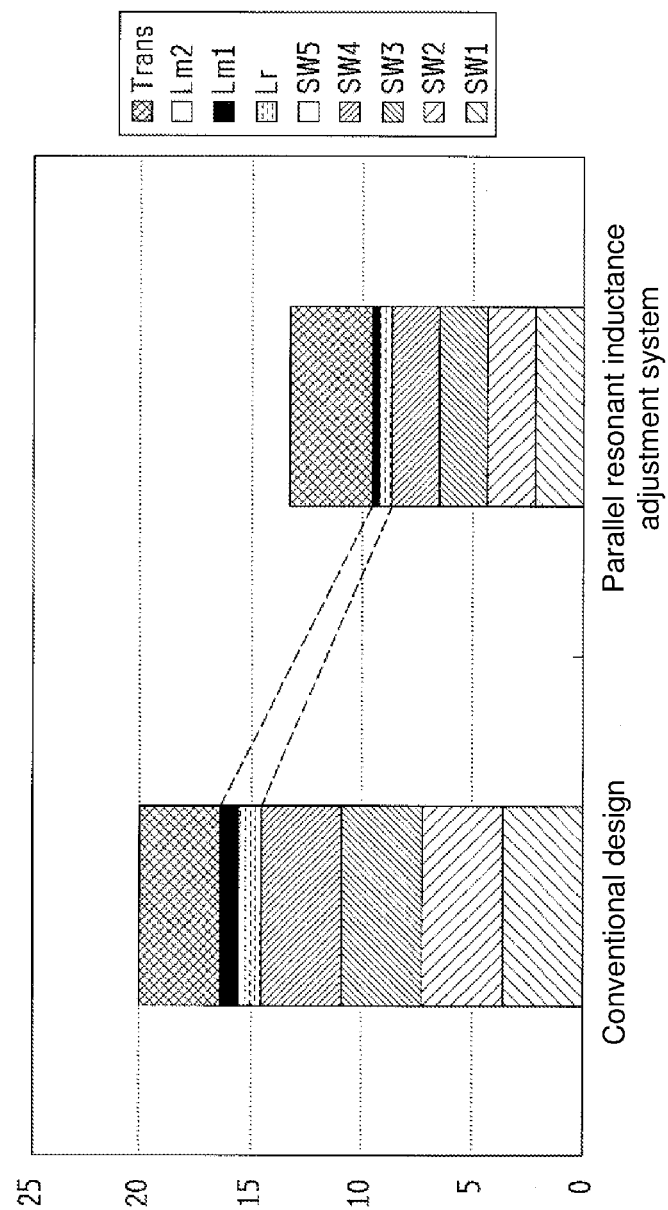
FIG. 4 is a graph illustrating an analysis result of details of losses by the current resonant type converter 100 when the input voltage Vin is 350 V and an output is 4 kW in comparison with a conventional design.

FIG. 4 is a graph illustrating an analysis result of details of losses by the current resonant type converter 100 when the input voltage Vin is 350 V and an output is 4 kW in comparison with the conventional design.

As illustrated in FIG. 4, as compared with the conventional design, it is found that losses at the switches SW1 to SW4 and coils (Lr, Lm) are reduced.

Figure 5:
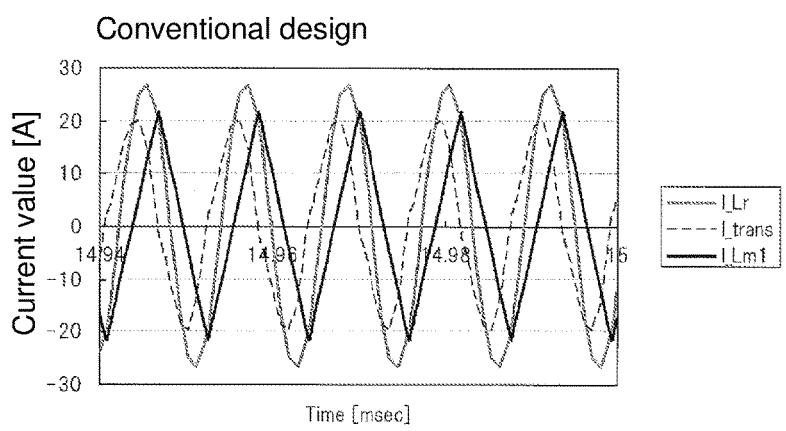
Figure 5:
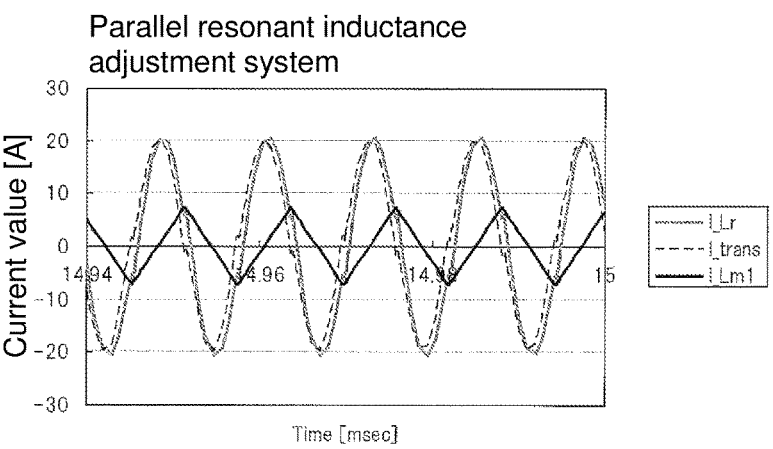

FIGS. 5(a) and 5(b) illustrate current waveforms of the coils and the transformer in the current resonant type converter 100 when the input voltage Vin is 350 V and the output is 4 kW in comparison with the conventional design, in which FIG. 5(a) is a graph of each current waveform in the conventional design and FIG. 5(b) is a graph of each current waveform in the current resonant type converter 100.

As illustrated in FIG. 5(a), it can be found that in the conventional design, since the parallel resonant inductance Lm1 has a small value, the parallel resonance current is large.

By contrast, as illustrated in FIG. 5(b), in the parallel resonant inductance adjustment system current resonant type converter 100, since the parallel resonant inductance Lm1 is substantially large, the parallel resonance current is minimized. As a result, it is considered that the present system had a smaller loss.

First Modification Example of the First Embodiment

Figure 6:
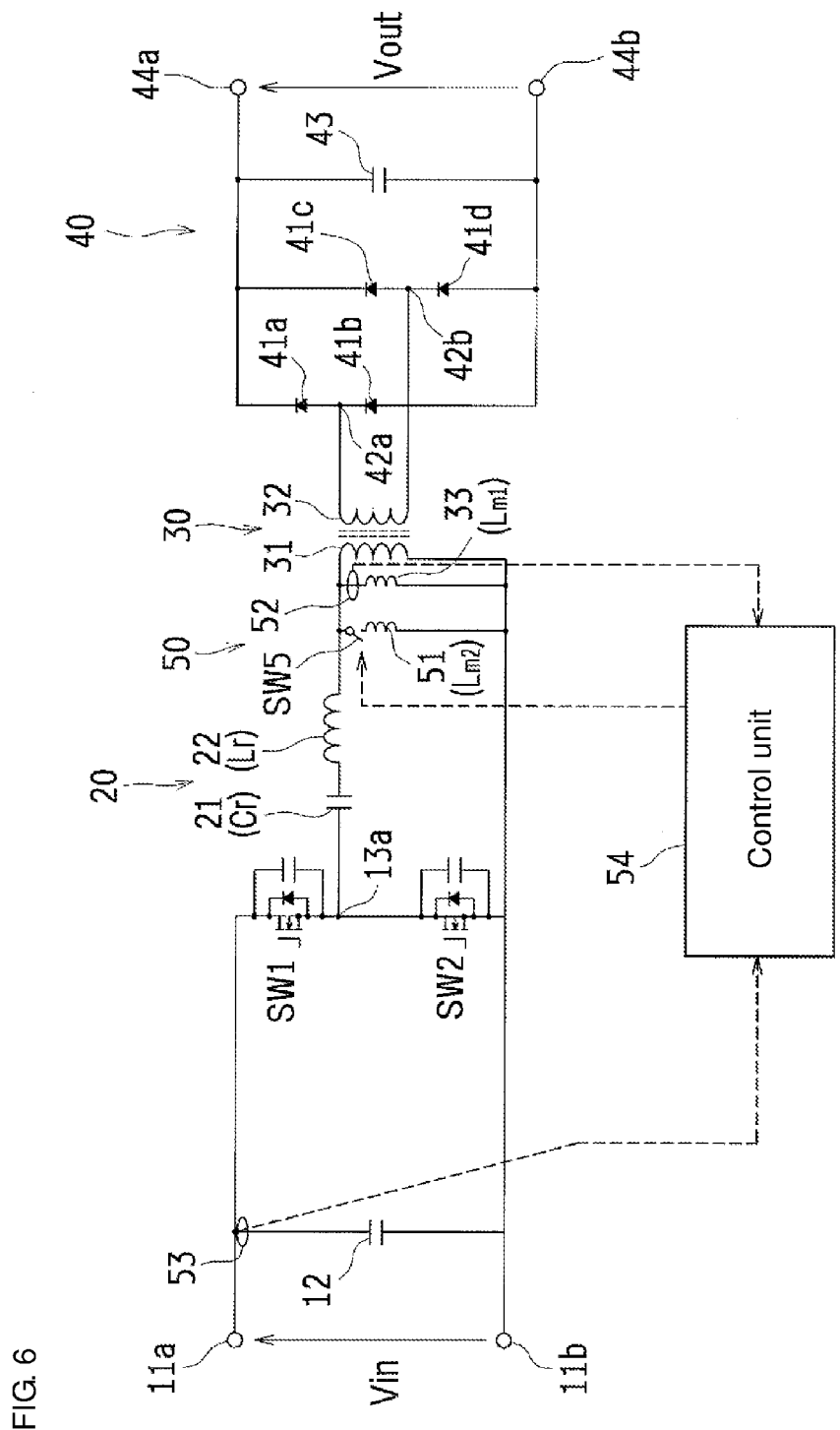
FIG. 6 is a diagram showing an outline configuration of a parallel resonant inductance adjustment system current resonant type converter 100A according to a first modification example of the first embodiment of the present invention.

FIG. 6 is a diagram showing an outline configuration of a parallel resonant inductance adjustment system current resonant type converter 100A according to a first modification example of the first embodiment of the present invention. The same components as those of the first embodiment are identified by the same reference numerals to appropriately omit description thereof.

Although in the above-described switching circuit 10 of the first embodiment, the switches SW1 to SW4 configure a fullbridge switching circuit, the circuit configuration is not limited thereto. For example, as in the current resonant type converter 100A as illustrated in FIG. 6, the switching circuit 10 of the first embodiment may be replaced by a halfbridge switching circuit 10A and one end of the primary side winding 31 of the transformer 30 (the end not connected to the resonant coil 22 side of the LC resonance circuit 20) may be connected to the input terminal 11b.

Second Modification Example of the First Embodiment

Figure 7:
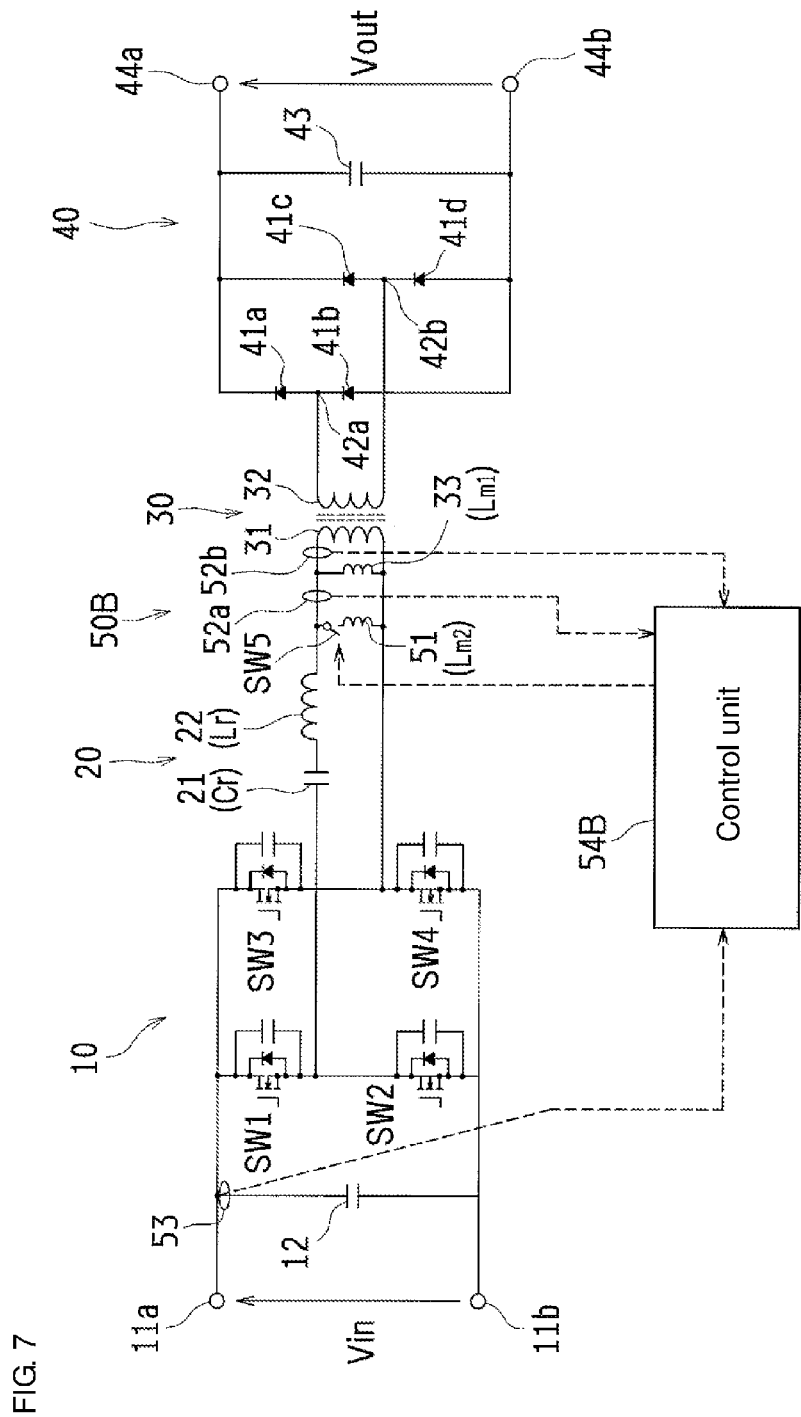
FIG. 7 is a diagram showing an outline configuration of a parallel resonant inductance adjustment system current resonant type converter 100B according to a second modification example of the first embodiment of the present invention.

FIG. 7 is a diagram showing an outline configuration of a parallel resonant inductance adjustment system current resonant type converter 100B according to a second modification example of the first embodiment of the present invention. The same components as those of the first embodiment are identified by the same reference numerals to appropriately omit description thereof.

Although in the above-described parallel resonant inductance adjustment circuit 50 of the first embodiment, the current sensor 52 is used which is configured to directly detect a value and a direction of a current passing through the coil 33, a detection method is not limited thereto. For example, as in the current resonant type converter 100B illustrated in FIG. 7, in place of the current sensor 52 of the first embodiment, a current sensor 52a and a current sensor 52b may be provided which are configured to detect a value and a direction of a current passing between the switch SW5 and the coil 33 and configured to detect a value and a direction of a current passing through the primary side winding 31 of the transformer 30, respectively.

Here, with a current passing between the switch SW5 and the coil 33 represented as Ia and a current passing through the primary side winding 31 of the transformer 30 represented as Ib, a value and a direction of a current passing through the coil 33 can be calculated from Ia-Ib. Such configuration change necessitates replacement of the control unit 54 of the first embodiment by a control unit 54B whose control contents are changed to some extent.

Second Embodiment

Figure 8:
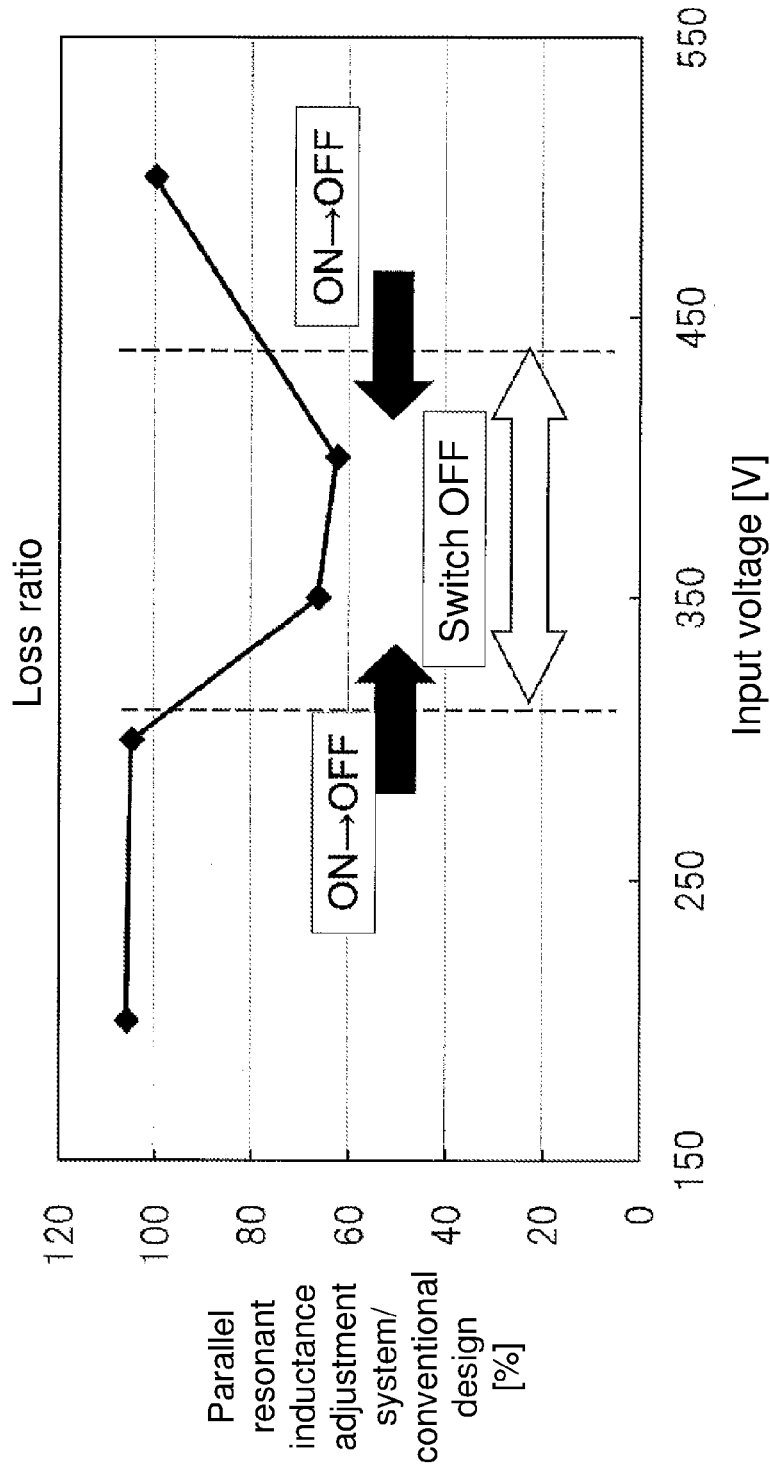
FIG. 8 is a diagram for explaining an outline of on-off control of the switch SW5 in a parallel resonant inductance adjustment system current resonant type converter according to a second embodiment of the present invention.

FIG. 8 is a diagram for explaining an outline of on-off control of the switch SW5 in a parallel resonant inductance adjustment system current resonant type converter according to a second embodiment of the present invention.

In the above-described parallel resonant inductance adjustment circuit 50 of the first embodiment, the control unit 54 conducts control based only on the input voltage Vin detected by the voltage sensor 53 in a manner such that when the input voltage Vin is within the transition condition voltage range, the switch SW5 is tuned off and when the same is not within the transition condition voltage range, the switch SW5 is tuned on.

However, when the input side is connected to, for example, a solar panel, the input voltage Vin fluctuates according to an amount of solar radiation. When the input voltage Vin minutely fluctuates across an upper limit or a lower limit of the transition condition voltage range, the switch SW5 repeats turning-on and turning-off each time, so that such a phenomenon as so-called chattering might occur.

Therefore, for suppressing such chattering as much as possible, on-off control of the switch SW5 so as to have a so-called hysteresis is desirable. Specifically, description will be made of a case where the transition condition voltage range of the input voltage Vin is in a range of 320 V to 440 V.

(1) When the Switch SW5 is Off

When the input voltage Vin fluctuates from within to outside the transition condition voltage range, the switch SW5 is switched from off to on. Then, the transition condition voltage range of the input voltage Vin is temporarily changed to a range narrower than the original range, e.g. (320+Vh) V to (440−Vh) V. Here, Vh represents a hysteresis voltage.

With this configuration, even when the input voltage Vin decreases slightly below, for example, 320 V, to switch the switch SW5 from off to on, and immediately thereafter, returns to 320 V again, because the input voltage Vin fails to reach (320+Vh) V, the switch SW5 is maintained in an on state without returning to an off state.

When the input voltage Vin further increases to reach (320+Vh) V, at that time point, the switch SW5 is switched from on to off.

(2) When the Switch SW5 is On

As described above, when the switch SW5 is switched to on, the transition condition voltage range of the input voltage Vin is temporarily changed to a range narrower than the original range, for example, to a range of (320+Vh) V to (440−Vh) V. Therefore, while even when the input voltage Vin increases, for example, from less than 320 V to reach 320 V, the switch SW5 is maintained in the on state, when the input voltage Vin further increases to reach (320+Vh) V, at that time point, the switch SW5 is switched from on to off. At that time, the transition condition voltage range of the input voltage Vin is restored to the original range.

With this configuration, even when the input voltage Vin slightly exceeds, for example, (320+Vh) V, to switch the switch SW5 from on to off and immediately thereafter, returns to (320+Vh) V again, because the input voltage Vin fails to reach 320 V, the switch SW5 is maintained in the off state without returning to the on state again.

When the input voltage Vin further decreases to be less than 320 V, at that time point, the switch SW5 is switched from off to on. At this time, as above described, the transition condition voltage range of the input voltage Vin is temporarily changed to a range narrower than the original range.

In temporarily changing the transition condition voltage range of the input voltage Vin, change of the transition condition voltage range is not necessarily conducted when the switch SW5 is on. Conversely, when the switch SW5 is off, the range may be changed to a range wider than the original range. In other words, the transition condition voltage range can be relatively narrower when the switch SW5 is on than when the same is off.

Additionally, the lower limit side and the upper limit side of the transition condition voltage range of the input voltage Vin may not necessarily changed in the same voltage width. For example, the range may be (320+Vh1) V to (440−Vh2). Here, Vh1 and Vh2 both represent hysteresis voltages set to hold a relation of Vh1≠Vh2. A method different from such control may be used to have a hysteresis.

Additionally, the lower limit side and the upper limit side of the transition condition voltage range of the input voltage Vin may not be changed simultaneously. For example, when the input voltage Vin is in the vicinity of the lower limit side of the transition condition voltage range, only the lower limit side of the transition condition voltage range can be temporarily changed. In other words, it is only necessary to change at least one of the lower limit side and the upper limit side of the transition condition voltage range of the input voltage Vin.

Since the resonance frequency fr2 of the LLC resonance circuit changes before or after turns-on or off of the switch SW5, the switching frequency f and a gain characteristics discontinuously change. For copying with this discontinuous change, it is desirable to conduct control such that the switching frequency f is corrected in combination with switching of the switch SW5.

Third Embodiment

In the above-described first embodiment and second embodiment, when the parallel resonant inductance adjusting switch SW5 of the parallel resonant inductance adjustment circuit 50 is switched from off (see FIG. 2(a)) to on (see FIG. 2(b)), because the coil 51 (adjusting parallel resonant inductance Lm2) is present in series to the switch SW5, a current change is moderate and involves no problem.

However, when the switch SW5 is conversely switched from on to off, since a current in the coil 51 (the adjusting parallel resonant inductance Lm2) continues flowing as it is, abrupt turning-off during current conduction causes generation of a surge voltage, thereby possibly producing such an adverse effect as damages to the switch SW5.

Under these circumstances, for avoiding such a situation as much as possible, a different configuration of the parallel resonant inductance adjusting switch is taken as a third embodiment, of which differences will be mainly described in the following.

Figure 9:
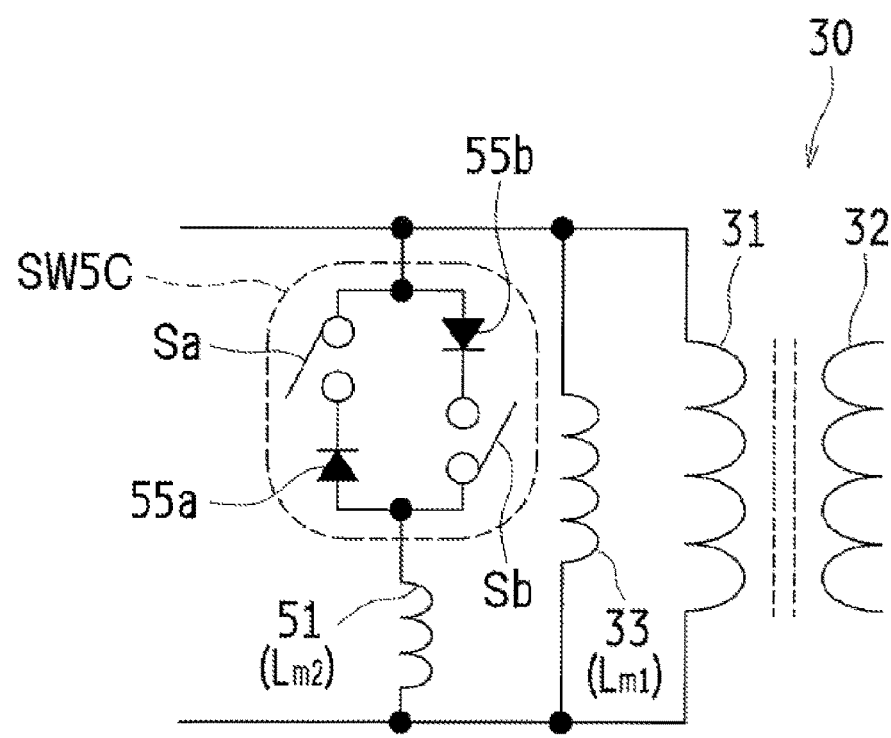
FIG. 9 is a diagram showing an outline configuration of a parallel resonant inductance adjusting switch SW5C in a parallel resonant inductance adjustment system current resonant type converter according to a third embodiment of the present invention.

FIG. 9 is a diagram showing an outline configuration of a parallel resonant inductance adjusting switch SW5C in a parallel resonant inductance adjustment system current resonant type converter according to the third embodiment of the present invention. The same components as those of the first embodiment are identified by the same reference numerals to appropriately omit description thereof.

As illustrated in FIG. 9, the switch SW5C includes a rectifier element 55a, a switch Sa connected in series to a cathode side of the rectifier element 55a, a rectifier element 55b, and a switch Sb connected in series to a cathode side of the rectifier element 55b. Examples of the rectifier elements 55a and 55b include a diode, but are not limited thereto.

Then, the switch Sa and the rectifier element 55a connected in series are connected in parallel to the rectifier element 55b and the switch Sb connected in series, in which a rectification direction of the rectifier element 55a (upward in FIG. 9) and a rectification direction of the rectifier element 55b (downward in FIG. 9) are then reverse to each other.

FIGS. 10(a) to 10(e) are diagrams for explaining an outline of an operation sequence of the parallel resonant inductance adjusting switch SW5C in the parallel resonant inductance adjustment system current resonant type converter according to the third embodiment of the present invention.

Figure 10:
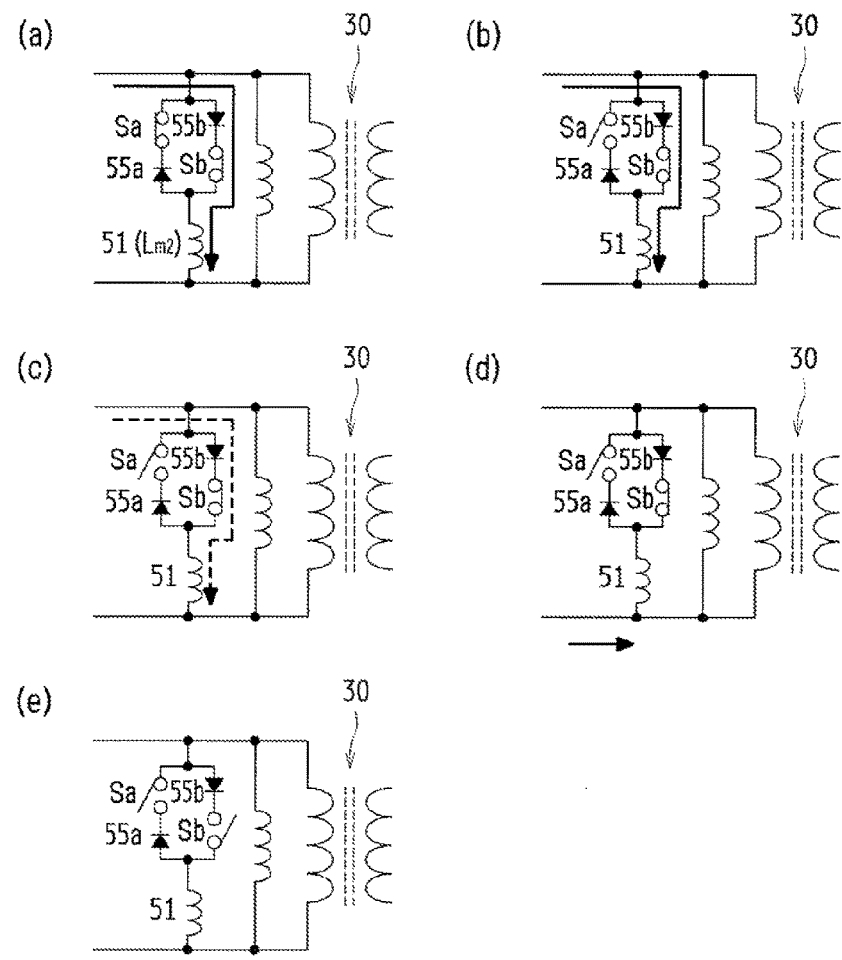

As illustrated in FIG. 10(a), it is assumed that for example, the input voltage Vin is lower than the transition condition voltage range and the switch Sa and the switch Sb are both in the on state. When a detection result of the current sensor 52 finds that current flows from the LC resonance circuit 20 to a direction of the coil 51 (adjusting parallel resonant inductance Lm2) (downward in FIG. 10(a)), if a detection result of the voltage sensor 53 finds that the input voltage Vin increases to enter the transition condition voltage range, the switch SW5C needs to be switched from on to off.

At this time, since the rectification direction of the rectifier element 55a is reverse to the direction of the current flowing through the coil 51, no current is flowing through the switch Sa connected in series to the rectifier element 55a. Therefore, as illustrated in FIG. 10(b), no surge voltage is generated even when the switch Sa is switched from on to off.

Since current flowing through the coil 51 is a resonance current, the current gradually decreases as illustrated in FIG. 10(c). Then, after the resonance current attains 0, the current direction is inverted as illustrated in FIG. 10(d). At this time, since the inverted current direction is reverse to the rectification direction of the rectifier element 55b, no current flows to the switch Sb connected in series to the rectifier element 55b.

Then, as illustrated in FIG. 10(e), even when the switch Sb is switched from on to off, no surge voltage is generated. As a result, both the switch Sa and the switch Sb are turned off to complete switching of the switch SW5C from on to off.

Since by controlling switching of the switch Sa and the switch Sb in such a sequence, the switch SW5C is switched from on to off while no current is flowing through the coil 51, generation of a surge voltage can be suppressed, while minimizing reverse recovery losses of the rectifier element 55a and the rectifier element 55b.

Similarly to the case of FIG. 10(a), when, for example, the input voltage Vin is lower than the transition condition voltage range and the switch Sa and the switch Sb are both in the on state, while a current direction detected by the current sensor 52 is a reverse direction, the same control as in FIGS. 10(a) to 10(e) can be conducted after reading the above-described switch Sa as the switch Sb, and vice versa and reading the rectifier element 55a as the rectifier element 55b, and vice versa.

Figure 11:
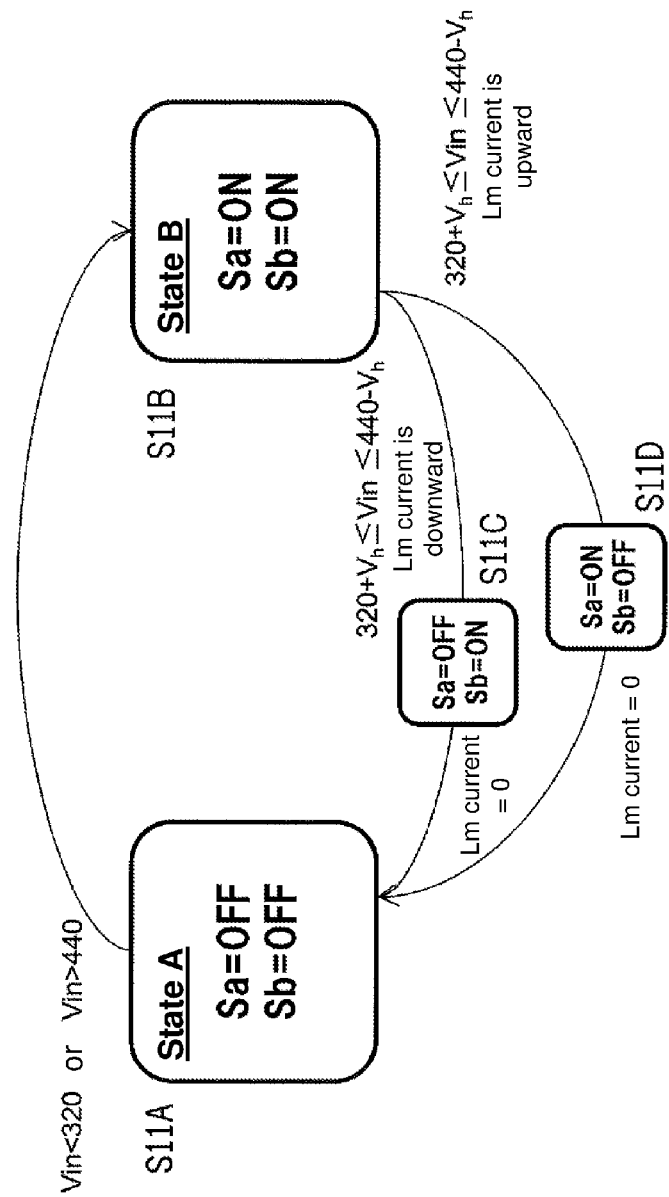
FIG. 11 is a diagram for explaining an outline of a state transition in a case where the parallel resonant inductance adjustment system current resonant type converter according to the third embodiment of the present invention is configured such that on-off switching of the parallel resonant inductance adjusting switch SW5C also has a hysteresis.
Figure 12:
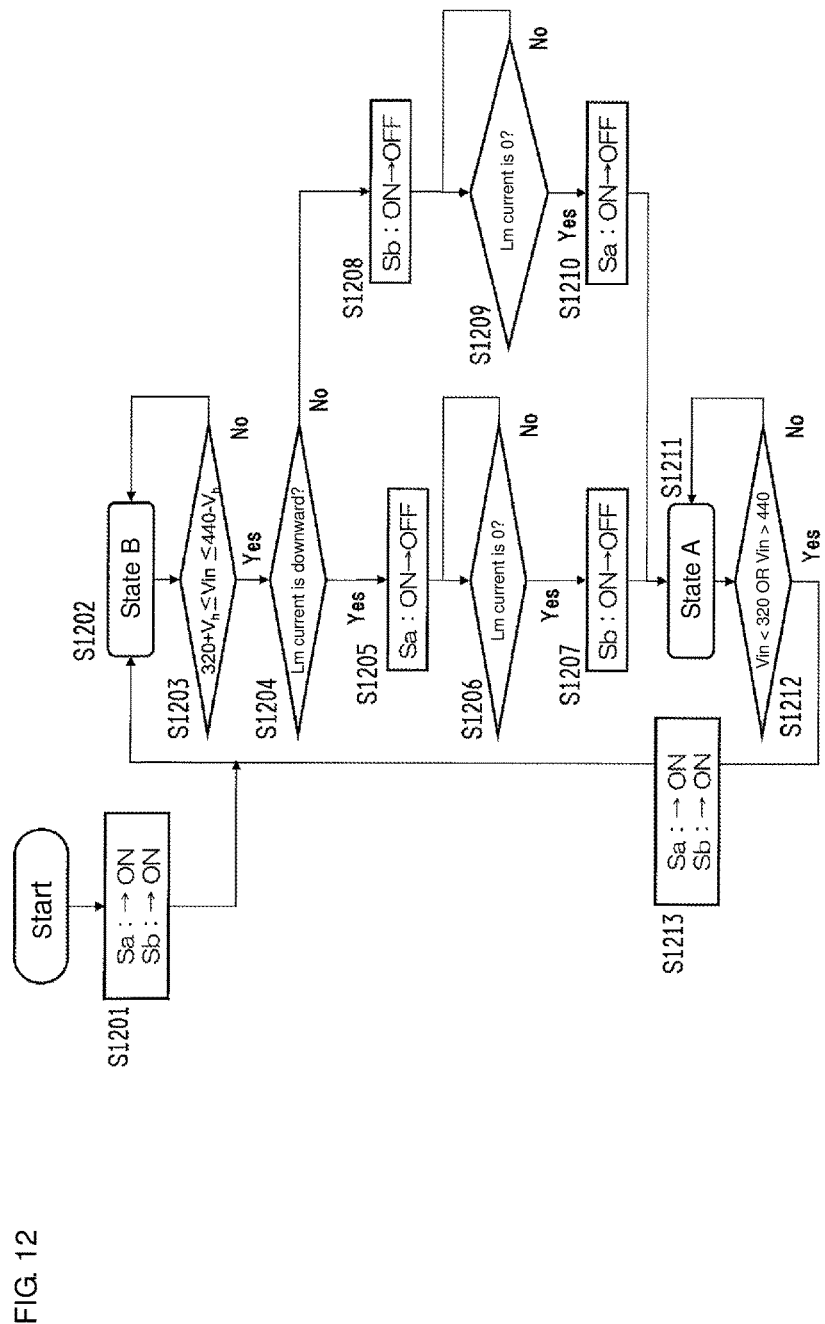
FIG. 12 is a schematic flow chart of operation in a case where the parallel resonant inductance adjustment system current resonant type converter according to the third embodiment of the present invention is configured such that on-off switching of the parallel resonant inductance adjusting switch SW5C also has a hysteresis.

FIG. 11 is a diagram for explaining an outline of a state transition in a case where the parallel resonant inductance adjustment system current resonant type converter according to the third embodiment of the present invention is configured such that on-off switching of the parallel resonant inductance Lm adjusting switch SW5C also has a hysteresis. FIG. 12 is a schematic flow chart of operation of the converter. For conducting such control as illustrated in these figures, the configuration of the control unit 54 or contents of the control thereof in the first embodiment should be changed to some extent. For example, it is necessary to increase the control output signal from the control unit to two lines so that the switch Sa and the switch Sb can be independently turned on or off. In combination, the contents of the control should be changed.

As illustrated in FIG. 12, first, both the switch Sa and the switch Sb are initialized to on (S1201) to thereafter transit to a state B (S1202, corresponding to S11B in FIG. 11).

In the state B, the voltage sensor 53 detects the input voltage Vin to determine whether it is within the range of (320+Vh) V to (440−Vh) V or not (S1203). When the determination result is No, the routine returns to S1202.

When the determination result is Yes, then, the current sensor 52 detects the current of the coil 51 (hereinafter referred to as "parallel resonance current") to determine a direction thereof (S1204). When the parallel resonance current is directed downward as illustrated in FIG. 10(a), the routine proceeds to S1205 and when the same is directed upward, the routine proceeds to S1208.

In S1205, as illustrated in FIG. 10(b), the switch Sa is switched from on to off (corresponding to S11C in FIG. 11).

Next, the parallel resonance current detected by the current sensor 52 is monitored to determine whether the parallel resonance current attains 0 as illustrated in FIG. 10(d) or not (S1206). When the current is yet to attain 0, the processing of S1206 is repeated and when the same attains 0, the switch Sb is switched from on to off (S1207) as illustrated in FIG. 10(e) to thereafter transit to a state A (S1211, corresponding to S11A in FIG. 11).

On the other hand, in 1208, the switch Sb is switched from on to off (corresponding to S11D in FIG. 11).

Next, the parallel resonance current detected by the current sensor 52 is monitored to determine whether the parallel resonance current attains 0 or not (S1209). When the current is yet to attain 0, the processing of S1209 is repeated and when the same attains 0, the switch Sa is switched from on to off (S1210) to thereafter transit to the state A (S1211, corresponding to S11A in FIG. 11).

In the state A, the voltage sensor 53 detects the input voltage Vin to determine whether it is less than 320 V, or 440 V or more (S1212). When the determination result is No, the routine returns to S1211.

When the determination result is Yes, the switch Sa and the switch Sb are both switched to on (S1213) to thereafter transit to the state B (S1202, corresponding to S11B in FIG. 11).

Other Embodiments

The control unit 54 of the first embodiment, the control unit 54B of the second modification example of the first embodiment, and the control unit for the third embodiment which are the described above may be taken as a control integrated circuit (IC).

In particular, use of a control integrated circuit (IC) as the control unit for the third embodiment allows realization of the parallel resonant inductance adjustment system current resonant type converter according to the third embodiment which needs complicated control of two switches at appropriate timing.

Additionally, the control units of the above-described respective embodiments can be realized by incorporating an appropriate program into a general-purpose CPU or the like.

The present invention can be embodied in other various forms without departing from a gist or main features of the present invention. Therefore, the above-described embodiments are for illustrative purpose only and are not to be construed as limiting. The scope of the present invention is indicated by the claims and not restricted by the text of the specification in any manner. Further, modification and variation belonging to an equivalence of the scope of the claims are all covered by the present invention.

The present application claims priority from Japanese Patent Application No. 2014-050634 filed on Mar. 13, 2014. The disclosure of the application is incorporated into the present application by reference. Additionally, the documents referred to in the present specification are all specifically incorporated herein by reference thereof.

INDUSTRIAL APPLICABILITY

The present invention is suitable not only for a PV (photovoltaics) converter, a storage battery charger and a wind power generation converter for which an insulation type DC-DC converter is used but also for a control IC for an insulation type DC-DC converter.

DESCRIPTION OF SYMBOLS 100 current resonant type converter
100A current resonant type converter
100B current resonant type converter
10 switching circuit
11a, 11b input terminal
12 capacitor
SW1 to SW4 switch
13a, 13b connection point
20 LC resonance circuit
21 resonant capacitor
22 resonant coil
30 transformer
31 primary side winding
32 secondary side winding 33 (Lm1) coil
40 rectifier circuit
41a to 41d rectifier element
42a, 42b connection point
43 capacitor
44a, 44b output terminal
50 parallel resonant inductance adjustment circuit
50B parallel resonant inductance adjustment circuit
51 (Lm2) coil
SW5 switch
SW5C switch
Sa switch
Sb switch
52 current sensor
52a, 52b current sensor
53 voltage sensor
54 control unit
54B control unit
55a rectifier element
55b rectifier element
Vin input voltage
Vout output voltage

The invention claimed is:

1. A current resonant type DC voltage converter, comprising:
a switching unit configured to generate an AC voltage from a DC input voltage;
a resonance circuit comprising a resonant capacitance and a first resonant inductance and configured to resonate in response to application of the AC voltage to the resonant capacitance and the first resonant inductance;
a transformer having a primary side thereof connected in series to the resonance circuit;
a second resonant inductance coupled to the resonance circuit and in parallel to the transformer;
a rectifier configured to rectify a current appearing on a secondary side of the transformer to generate a DC output voltage;
a voltage detection unit configured to detect the input voltage or the output voltage;
a parallel resonant inductance adjustment unit configured to vary the second resonant inductance, the parallel resonant inductance adjustment unit comprising an adjusting inductance connected in parallel on the primary side of the transformer via a switch; and
a control unit that controls the switch based on the input voltage or the output voltage detected by the voltage detection unit, wherein
the switch comprises:
a first rectifier element;
a first direction switch connected in series to the first rectifier element;
a second rectifier element; and
a second direction switch connected in series to the second rectifier element, wherein
a rectification direction of the first rectifier element is set to be a first direction and a rectification direction of the second rectifier element is set to be a second direction, the first rectifier element and the first direction switch are connected in parallel to the second rectifier element and the second direction switch so that the first direction and the second direction are reverse to each other.

2. The current resonant type DC voltage converter according to claim 1,
wherein the control unit has a transition condition voltage range fixed as a condition for a switching state transition of the switch, and
the control unit conducts control to open the switch when the input voltage or the output voltage is within the transition condition voltage range and close the switch when the input voltage or the output voltage is not within the transition condition voltage range.

3. The current resonant type DC voltage converter according to claim 2, wherein the control unit conducts switching control having a hysteresis by varying the transition condition voltage range when the switch is closed with respect to the transition condition voltage range when the switch is opened.

4. The current resonant type DC voltage converter according to claim 3, wherein when the switch is closed, the control unit changes the transition condition voltage range to a range narrower than the transition condition voltage range when the switch is opened.

5. The current resonant type DC voltage converter according to claim 1, further comprising:
a current detector that detects a parallel resonance current value flowing through a parallel resonant inductance of the transformer and a parallel resonance current direction,
wherein when both the first direction switch and the second direction switch are closed, when the input voltage or the output voltage changes from outside to within the transition condition voltage range, if the parallel resonance current direction is the first direction, the control unit controls the first direction switch and the second direction switch so as to first open the second direction switch and then, after the parallel resonance current value attains a zero value, open the first direction switch, and if the parallel resonance current direction is the second direction, so as to first open the first direction switch and then, after the parallel resonance current value attains a zero value, open the second direction switch.

6. A control integrated circuit comprising the control unit of the current resonant type DC voltage converter according to claim 5.

7. A current resonant type DC voltage conversion method comprising:
generating an AC voltage from a DC input voltage;
resonating, by a resonance circuit having a resonant capacitance and a first resonant inductance resonating in response to application of the AC voltage;
transforming by a transformer having a primary side thereof connected in series to the resonance circuit;
rectifying a current appearing on a secondary side of the transformer to generate a DC output voltage;
detecting the input voltage or the output voltage;
varying, via a parallel resonant inductance adjustment unit, a second resonant inductance coupled to the resonance circuit and in parallel to the transformer, wherein the parallel resonant inductance adjustment unit comprises an adjusting inductance connected in parallel on the primary side of the transformer via a switch; and
controlling the switch, via a switch controller, based on the detected input voltage or output voltage, wherein the switch comprises:
a first rectifier unit;
a first direction switch connected in series to the first rectifier unit;
a second rectifier unit; and
a second direction switch connected in series to the second rectifier unit, wherein when a rectification direction of the first rectifier unit is set to be a first direction and a rectification direction of the second rectifier unit is set to be a second direction, the first rectifier unit and the first direction switch are connected in parallel to the second rectifier unit and the second direction switch so that the first direction and the second direction are reverse to each other.

8. The current resonant type DC voltage conversion method according to claim 7, wherein
wherein the switch controller has a transition condition voltage range fixed as a condition for a switching state transition of the switch, and
the switch controller conducts control to open the switch when the input voltage or the output voltage is within the transition condition voltage range and close the switch when the input voltage or the output voltage is not within the transition condition voltage range.

9. The current resonant type DC voltage conversion method according to claim 8, wherein the switch controller conducts switching control having a hysteresis by varying the transition condition voltage range when the switch is closed with respect to the transition condition voltage range when the switch is opened.

10. The current resonant type DC voltage conversion method according to claim 9, wherein when the switch is closed, the switch controller changes the transition condition voltage range to a range narrower than the transition condition voltage range when the switch is opened.

\* \* \* \* \*